US012794393B2

(12) United States Patent
Iwahashi et al.

(10) Patent No.: US 12,794,393 B2
(45) Date of Patent: Nov. 10, 2026

(54) ELECTRIC POWER CONVERSION SYSTEM

(71) Applicant: KABUSHIKI KAISHA YASKAWA DENKI, Kitakyushu (JP)

(72) Inventors: Koji Iwahashi, Fukuoka (JP); Satoshi Sueshima, Fukuoka (JP); Toshiaki Tsuruda, Fukuoka (JP)

(*) Notice: Subject to any disclaimer, the term of this patent is extended or adjusted under 35 U.S.C. 154(b) by 185 days.

(21) Appl. No.: 18/733,842

(22) Filed: Jun. 5, 2024

(65) Prior Publication Data

US 2024/0333191 A1 Oct. 3, 2024

Related U.S. Application Data

(63) Continuation of application No. PCT/JP2021/044755, filed on Dec. 6, 2021.

(51) Int. Cl.
*H02P 27/06* (2006.01)

(52) U.S. Cl.
CPC .................................... *H02P 27/06* (2013.01)

(58) Field of Classification Search
CPC ................................ H02P 27/06; H02M 7/48
USPC ................................................ 318/495, 494
See application file for complete search history.

(56) References Cited

U.S. PATENT DOCUMENTS 7,116,069 B1 * 10/2006 Holterman ......... G05B 19/0428 318/700
8,274,768 B2 * 9/2012 Ueki ....................... H02M 1/08 361/23
8,339,084 B2 * 12/2012 Welchko ............. H02P 29/0241 318/438
9,329,581 B2 * 5/2016 Hashimoto .............. G05B 9/02
2010/0309589 A1 12/2010 Ueki et al.
2013/0113301 A1 5/2013 Hashimoto et al.

FOREIGN PATENT DOCUMENTS

JP 2002-238264 8/2002
JP 2010-284051 12/2010
JP 2013-101459 5/2013
(Continued)

OTHER PUBLICATIONS

Office Action issued in Japanese Patent Application No. P2023-565691, dated Aug. 26, 2025 (with English partial translation).
(Continued)

*Primary Examiner* — David Luo
(74) *Attorney, Agent, or Firm* — SHIPWAY IP

(57) ABSTRACT

A power conversion system includes a plurality of power modules and a control module including a current source and a main switch that cuts off the switch drive current supplied by the current source in response to an external abnormality. Each power module includes power conversion circuitry, a power-off switch that cuts off the electric power from the power conversion circuitry in response to a disappearance of the switch drive current supplied by the current source, and an input cutoff switch that cuts off the switch drive current to the power-off switch in response to an internal abnormality. The current source and the main switch are connected to the power-off switch and the input cutoff switch to provide a connection in which one of a pair of power-off input terminals and one of a pair of cutoff output terminals are connected to each other.

20 Claims, 7 Drawing Sheets

(56) References Cited

FOREIGN PATENT DOCUMENTS

| | | |
|---|---|---|
| JP | 2013-132098 | 7/2013 |
| JP | 2019-088051 | 6/2019 |

OTHER PUBLICATIONS

International Search Report dated Jan. 25, 2022 for PCT/JP2021/044755.

International Preliminary Report on Patentability with Written Opinion dated Jun. 20, 2024 for PCT/JP2021/044755.

Office Action issued in Indian Patent Application No. 202417047500, dated May 7, 2026.

* cited by examiner

ELECTRIC POWER CONVERSION SYSTEM

CROSS-REFERENCE TO RELATED APPLICATIONS

This application is a continuation application of PCT Application No. PCT/JP2021/044755, filed on Dec. 6, 2021. The entire contents of the above listed PCT and priority applications are incorporated herein by reference.

BACKGROUND

Field

The present disclosure relates to a power conversion system, a power module, and a control module.

Description of the Related Art

Japanese Unexamined Patent Publication No. 2013-101459 discloses a system in which a plurality of drive circuits are monitored by one controller.

SUMMARY

Disclosed herein is a power conversion system. The power conversion system includes: a plurality of power modules; and a control module connected to the plurality of power modules, wherein the control module includes: a current source configured to supply a switch drive current; and a main switch configured to cut off the switch drive current supplied by the current source in response to an external abnormality detected outside the power conversion system, wherein each module of the plurality of power modules includes: power conversion circuitry configured to output electric power; a power-off switch configured to cut off the electric power from the power conversion circuitry in response to a disappearance of the switch drive current supplied by the current source; and an input cutoff switch configured to cut off the switch drive current to the power-off switch in response to an internal abnormality detected inside the module, and wherein the current source and the main switch are connected to the power-off switch and the input cutoff switch for each of the plurality of power modules to provide a series connection including the plurality of power modules.

Additionally, a power module is disclosed herein. The power module includes: power conversion circuitry connected to a control module and configured to output electric power; a first connector configured to receive a switch drive current supplied by a current source; a power-off switch configured to cut off the electric power from the power conversion circuitry in response to a disappearance of the switch drive current from the first connector; an input cutoff switch configured to cut off the switch drive current to the power-off switch in response to an internal abnormality detected inside the power module; a second connector configured to output the switch drive current that has passed through the power-off switch and the input cutoff switch; and a return line configured to return the switch drive current from the second connector to the first connector.

Additionally, control module connected to a plurality of power modules is disclosed herein. The control module includes: power conversion circuitry configured to output electric power; a power-off switch configured to cut off the electric power from the power conversion circuitry in response to a disappearance of a switch drive current; and an input cutoff switch configured to cut off the switch drive current to the power-off switch in response to an internal abnormality detected inside the module, wherein the control module includes: a current source configured to supply the switch drive current; a main switch configured to cut off the switch drive current supplied by the current source in response to an external abnormality detected outside the plurality of power modules; and a connector configured to connect the current source and the main switch to the power-off switch and the input cutoff switch for each of the plurality of power modules to provide a series connection including the plurality of power modules.

DETAILED DESCRIPTION

In the following description, with reference to the drawings, the same reference numbers are assigned to the same components or to similar components having the same function, and overlapping description is omitted.

Power Conversion System

Figure 1:
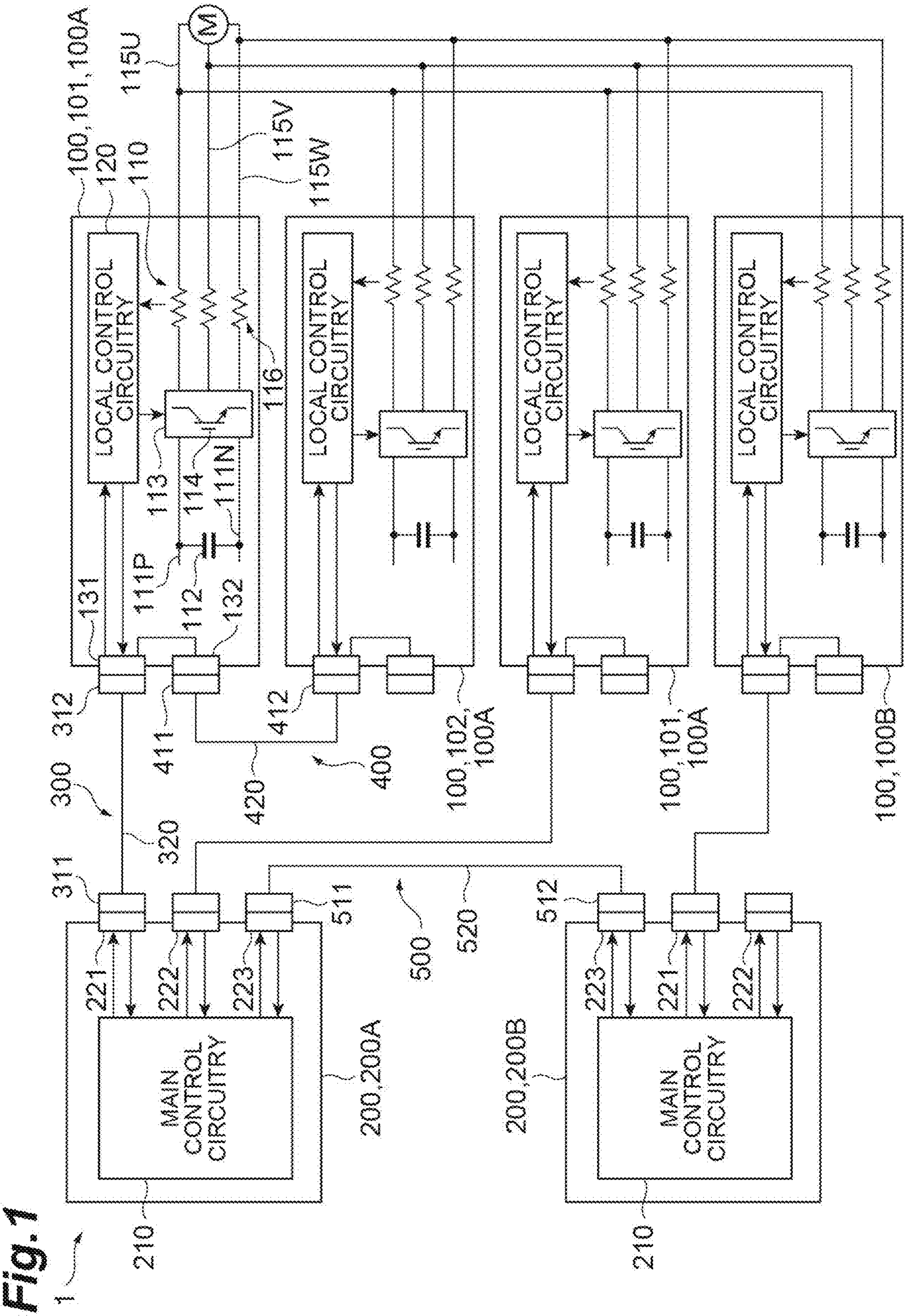
FIG. 1 is a block diagram illustrating an example configuration of a power conversion system.

A power conversion system 1 illustrated in FIG. 1 is a system that supplies electric power generated by a plurality of power modules to one or more loads. FIG. 1 illustrates a parallel multiplex type power conversion system 1 in which electric power generated by a plurality of power modules is combined and supplied to the same load. The power conversion system 1 may be a system that individually supplies electric power generated by a plurality of power modules to a plurality of loads. Examples of the load include, but are not limited to, a motor. The load may be anything as long as it functions by supplying electric power.

The power conversion system 1 includes a plurality of power modules 100 and a control module 200. Each power module 100 outputs electric power to a load. The control module 200 controls the plurality of power modules 100.

For example, the control module 200 may be a master controller that outputs one command to the plurality of power modules 100 so as to output electric power to a single load in a shared manner, or may be a programmable logic controller that outputs individual commands to the plurality of power modules 100 based on a predetermined sequence.

For example, the control module 200 includes main control circuitry 210. The main control circuitry 210 performs calculations for controlling the plurality of power modules 100. If the control module 200 is the master controller, the main control circuitry 210 generates an output command based on feedback signals from the plurality of power modules 100 and transmits the generated output command to the plurality of power modules 100.

If the control module 200 is a programmable logic controller, the main control circuitry 210 generates a plurality of output commands respectively corresponding to the plurality of power modules 100 based on a predetermined sequence and transmits each of the plurality of output commands to the corresponding power module 100.

Each of the plurality of power modules 100 includes power conversion circuitry 110 and local control circuitry 120. The power conversion circuitry 110 performs power conversion between a power supply side (primary side) and a load side (secondary side). Each of the primary side power and the secondary side power may be DC power or AC power.

FIG. 1 illustrates the power conversion circuitry 110 in a case where the primary side power is DC power and the secondary side power is three phase AC power. For example, the power conversion circuitry 110 includes DC buses 111P, 111N, a smoothing capacitor 112, inverter circuitry 113, output lines 115U, 115V, 115W, and a current sensor 116. The DC buses 111P, 111N supply DC power on the primary side. The smoothing capacitor 112 smooths the DC voltage in the DC buses 111P, 111N. The output lines 115U, 115V, 115W supply three phase AC power on the secondary side.

The inverter circuitry 113 generates three phase AC power on the secondary side connected to the output lines 115U, 115V, 115W by switching the connection state between the DC buses 111P, 111N and the output lines 115U, 115V, 115W by a plurality of switching elements 114. The current sensor 116 detects the current in each of the output lines 115U, 115V, 115W. The current sensor 116 may be configured to detect the respective currents of the output lines 115U, 115V, 115W and may be configured to detect the currents of any two phases of the output lines 115U, 115V, 115W. On the assumption that the sum of the three phase alternating currents is zero, the remaining one phase current may be detected based on the currents of two phases.

The local control circuitry 120 is configured to control the power conversion circuitry 110 to generate power on the secondary side corresponding to the output command received from the main control circuitry 210. For example, the local control circuitry 120 calculates the on/off timing of the plurality of switching elements 114 so as to generate power corresponding to the output command, and turns on/off the plurality of switching elements 114 based on the calculation result.

The power conversion system 1 may be configured to connect a plurality of power modules 100 to the control module 200 by a daisy chain. For example, the control module 200 includes a first connector 221 and the power module 100 includes a first connector 131 and a second connector 132. A predetermined upper limit number (for example, three) of the power modules 100 can be connected to the first connector 221 by a daisy chain. The daisy chain refers to a connection form in which three or more devices are connected in one line (so-called tying in a row). Each of the three or more devices may not be limited to a communication circuit.

The plurality of power modules 100 connected to the first connector 221 includes a direct connection module 101 and one or more indirect connection modules 102. The first connector 131 of the direct connection module 101 is connected to the first connector 221 by a cable harness 300. The cable harness 300 includes a connector 311 connected to the first connector 221, a connector 312 connected to the first connector 131 of the power module 100, and a cable 320 connecting the connector 311 and the connector 312.

The first connector 131 of the indirect connection module 102 is connected by a cable harness 400 to the second connector 132 of another power module 100 (the direct connection module 101 or the indirect connection module 102). For example, the first connector 131 of the indirect connection module 102 that is the second from the first connector 221 is connected by the cable harness 400 to the second connector 132 of the direct connection module 101. The first connector 131 of the indirect connection module 102 that is the third and subsequent from the first connector 221 is connected by the cable harness 400 to the second connector 132 of the indirect connection module 102.

In each of the plurality of power modules 100, the first connector 131 and the second connector 132 are connected to each other. Accordingly, the indirect connection module 102 is connected to the first connector 221 via the cable harness 300 and one or more cable harnesses 400.

The control module 200 may be configured to be connected to the plurality of power modules 100 by a plurality of daisy chains. For example, the control module 200 further includes a second connector 222 in addition to the first connector 221. A predetermined first upper limit number (for example, three) of the power modules 100 can be connected to the first connector 221 by a first daisy chain. A predetermined second upper limit number (for example, three) of the power modules 100 can be connected to the second connector 222 by a second daisy chain that is a different system from the first daisy chain.

The power module 100 connected to the second connector 222 also includes the direct connection module 101 and one or more indirect connection modules 102. The first connector 131 of the direct connection module 101 is connected to the second connector 222 by the cable harness 300. The first connector 131 of the indirect connection module 102 is connected by a cable harness 400 to the second connector 132 of another power module 100 (the direct connection module 101 or the indirect connection module 102).

The power conversion system 1 may include a plurality of control modules 200 connected to the plurality of power modules 100. For example, the power conversion system 1 includes two control modules 200. The two control modules 200 may include a primary control module 200A and a secondary control module 200B. The plurality of power modules 100 may include one or more primary power modules 100A connected to the primary control module 200A and one or more secondary power modules 100B connected to the secondary control module 200B. The one or more primary power modules 100A are controlled by the primary control module 200A and the one or more secondary power modules 100B are controlled by the primary control module 200A through the secondary control module 200B. For example, the primary control module 200A sends output commands to the primary power module 100A and the secondary control module 200B, and the secondary control module 200B controls the one or more secondary power modules 100B based on the output command received from the primary control module 200A. The secondary control module 200B may control the one or more secondary power modules 100B based on an output command that is different from the output command that the primary control module 200A outputs to the primary power module 100A.

The primary control module 200A and the secondary control module 200B are connected to each other. For example, each of the primary control module 200A and the secondary control module 200B further includes a third connector 223 in addition to the first connector 221 and the second connector 222. The third connector 223 of the secondary control module 200B is connected to the third connector 223 of the primary control module 200A by a cable harness 500. The cable harness 500 includes a connector 511 connected to the third connector 223 of the primary control module 200A, a connector 512 connected to the third connector 223 of the secondary control module 200B, and a cable 520 connecting the connector 511 and the connector 512.

According to the above configuration, in the power conversion system 1, the plurality of power modules 100 may be collectively controlled by one control module 200 (for example, the primary control module 200A). Here, the power conversion system may have a function of stopping output of power with reliability when an abnormality occurs.

Figure 2:
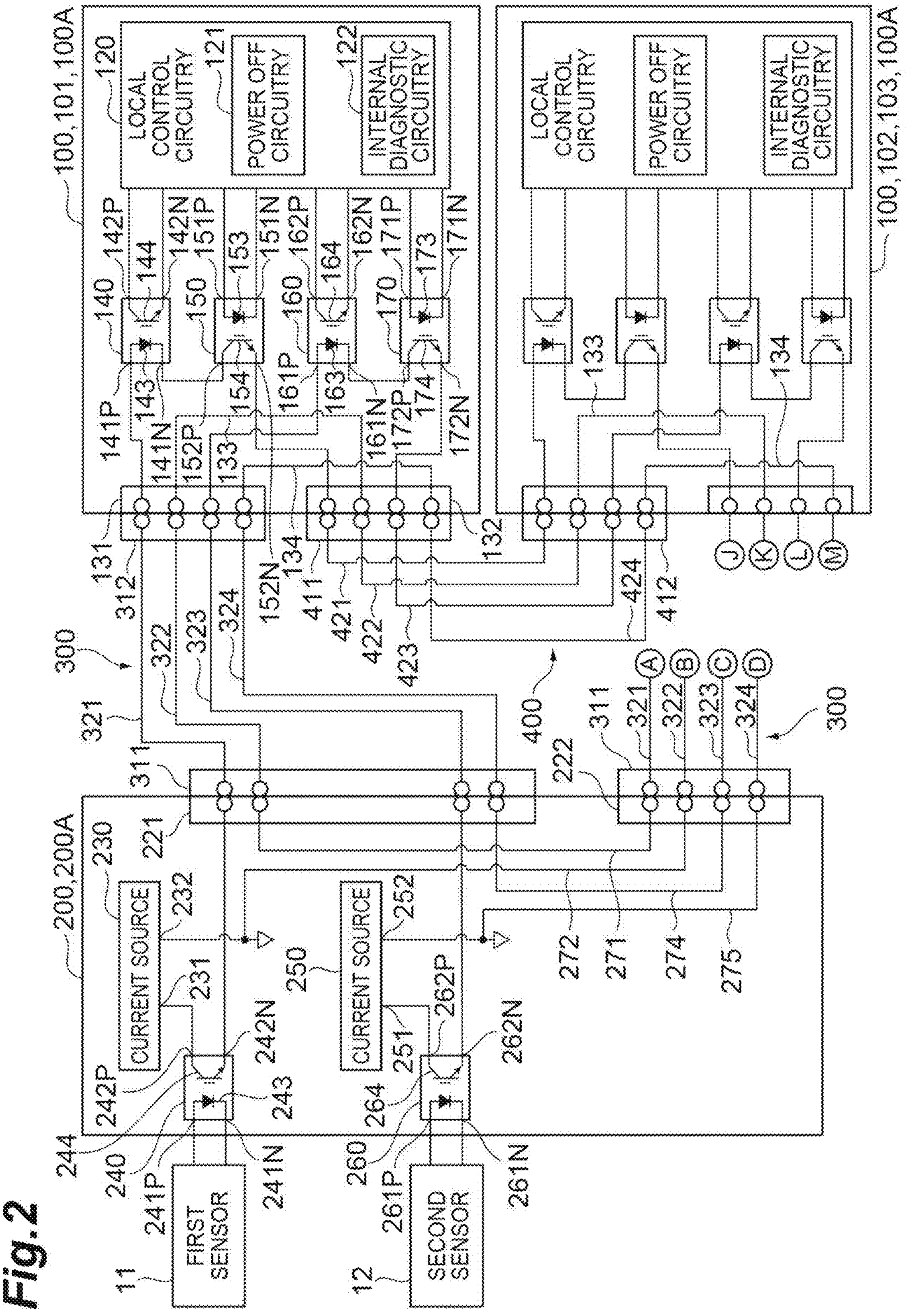
FIG. 2 is a block diagram illustrating an example output stop system configured by a first daisy chain.

In a case where an output stopping function is incorporated into a system that collectively controls the plurality of power modules 100 by one control module 200, the output of power from the plurality of power modules 100 may be collectively stopped when an abnormality occurs. To collectively stop output of power from the plurality of power modules 100, a system configuration may be complicated. In contrast, as illustrated in FIG. 2, the control module 200 further includes a current source 230 and a main switch 240. The current source 230 is configured to supply a switch drive current. The main switch 240 is configured to cut off switch drive current supplied by the current source 230 in response to detection of an external abnormality. The power module 100 further includes a power-off switch 140 and an input cutoff switch 150. The power-off switch 140 is configured to allow the output of the power conversion circuitry 110 to continue when there is an input of the switch drive current, and to stop the output of the power conversion circuitry 110 when the input of the switch drive current stops. The input cutoff switch 150 cuts off input of the switch drive current to the power-off switch 140 in response to detection of an internal abnormality. The current source 230, the main switch 240, and the power-off switch 140 and the input cutoff switch 150 of the plurality of power modules 100 are connected in series.

The plurality of power modules 100 can be collectively stopped with reliability by a simple configuration in which the current source 230, the main switch 240, and the power-off switch 140 and the input cutoff switch 150 of the plurality of power modules 100 are connected in series. For example, when an external abnormality occurs, the output of the plurality of power modules 100 can be stopped collectively by cutting off the switch drive current for the plurality of power modules 100 by the main switch 240. When an internal abnormality occurs in any of the plurality of power modules 100, output of the plurality of power modules 100 can be stopped collectively by cutting off the switch drive current to the plurality of power modules 100 by the input cutoff switch 150. Accordingly, both reliability of collectively stopping the plurality of power modules 100 and simplification of the system may be achieved. Hereinafter, a configuration for collectively stopping the plurality of power modules 100 will be described in more detail.

Figure 3:
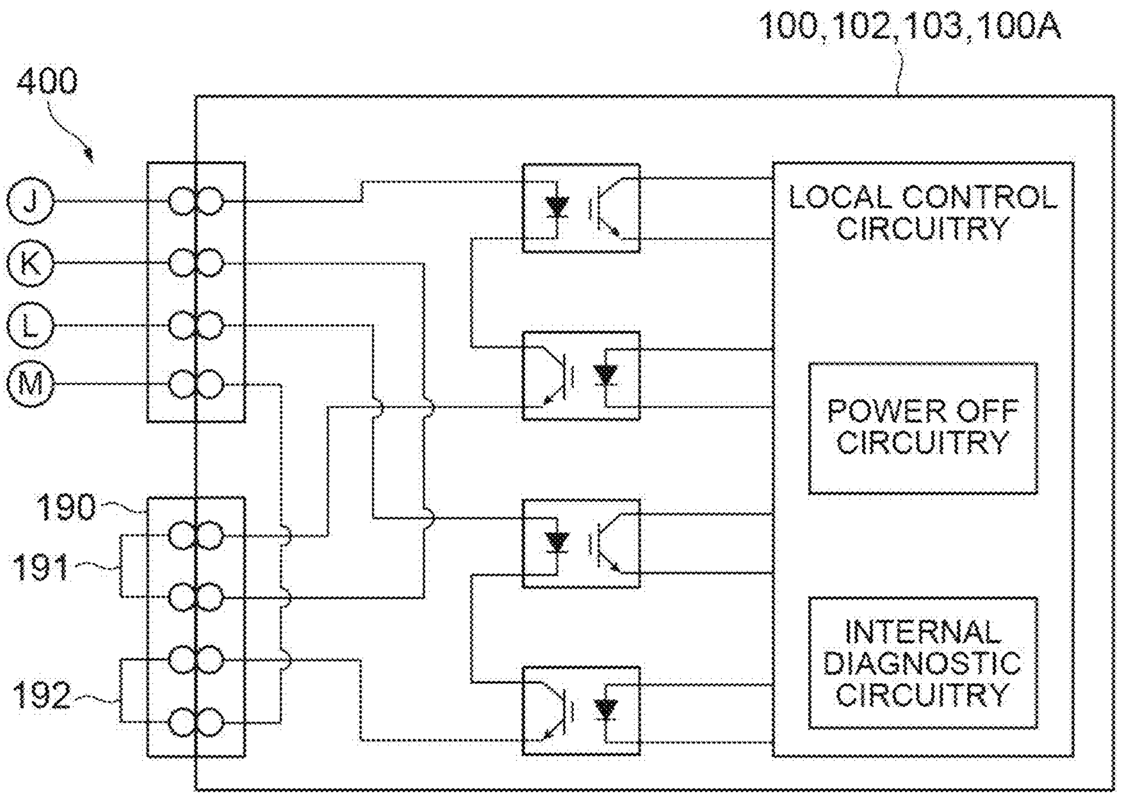
FIG. 3 is a block diagram illustrating an example output stop system configured by the first daisy chain.

FIGS. 2 and 3 illustrate an example output stop system configured by a first daisy chain. As an example, in the illustrated first daisy chain, three power modules 100 are connected to the first connector 221. As illustrated in FIG. 2, the current source 230 includes a positive terminal 231 and a negative terminal 232 and supplies switch drive current to circuitry connected to the positive terminal 231 and the negative terminal 232. The current source 230 may be a constant current source supplying a constant switch drive current. Supplying the constant switch drive current means supplying a switch drive current that is maintained close to a constant target current. Supplying the switch drive current in a state in which a deviation allowable in terms of control occurs between the switch drive current and the target current is included in supplying the constant switch drive current. The same applies to the following description.

The main switch 240 includes a pair of input terminals 241P, 241N and a pair of output terminals 242P, 242N. The pair of output terminals 242P, 242N are maintained in a connected (shortened) state by current input (an appearance of a current) to the pair of input terminals 241P, 241N and are disconnected from each other (opened) in response to stop (a disappearance of the current) of current input to the pair of input terminals 241P, 241N. For example, the main switch 240 is a photocoupler, and further includes a light-emitting element 243 and a light receiving element 244. The light-emitting element 243 emits light by current input to the pair of input terminals 241P, 241N. The light receiving element 244 is provided between the pair of output terminals 242P, 242N, maintains the pair of output terminals 242P, 242N in a connected state with each other when the light-emitting element 243 emits light, and disconnects the pair of output terminals 242P, 242N from each other when the light emission of the light-emitting element 243 stops. The pair of output terminals 242P, 242N are connected in series to the current source 230. For example, the output terminal 242P is connected to the positive terminal 231 of the current source 230 and the output terminal 242N is connected to the first connector 221.

The pair of input terminals 241P, 241N are connected to a first sensor 11. The first sensor 11 is a sensor that detects an external abnormality. The external abnormality refers to an abnormality that occurs outside the power conversion system 1. For example, the first sensor 11 is an object sensor, and detects entry of an object (including a human body) into a predetermined region as the external abnormality. The first sensor 11 inputs an on-current to the input terminals 241P, 241N when the external abnormality is not detected, and stops input of the on-current to the input terminals 241P, 241N when the external abnormality is detected. Thus, the main switch 240 cuts off switch drive current supplied by the current source 230 in response to detection of the external abnormality.

The power-off switch 140 includes a pair of power-off input terminals 141P, 141N and a pair of power-off output terminals 142P, 142N. The pair of power-off output terminals 142P, 142N are maintained in a conductive state by current input to the pair of power-off input terminals 141P, 141N and are cut off from each other in response to stop of current input to the pair of power-off input terminals 141P, 141N. For example, the power-off switch 140 is a photocoupler, and further includes a light-emitting element 143 and a light receiving element 144. The light-emitting element 143 emits light by current input to the pair of power-off input terminals 141P, 141N. The light receiving element 144 is provided between the pair of power-off output terminals 142P, 142N, maintains the pair of power-off output terminals 142P, 142N in a connected state with each other when the light-emitting element 143 emits light, and disconnect the pair of power-off output terminals 142P, 142N from each other when the light emission of the light-emitting element 143 stops. In a series connection of the current source 230, the main switch 240 and the power-off switch 140 and the input cutoff switch 150 of the plurality of power modules 100, the power-off input terminals 141P, 141N are connected to the main switch 240.

The pair of power-off output terminals 142P, 142N are connected to the local control circuitry 120. The local control circuitry 120 includes power-off circuitry 121. The power-off circuitry 121 stops the output from the power conversion circuitry 110 when the pair of power-off output terminals 142P, 142N are disconnected from each other. For example, when the pair of power-off output terminals 142P, 142N are disconnected from each other, the power-off circuitry 121 turns off all the switching elements 114 of the inverter circuitry 113 and disconnects the output lines 115U, 115V, 115W from the DC buses 111P, 111N. For example, the power-off circuitry 121 may be configured to power down drive circuitry of the switching element 114 by disconnecting the pair of power-off output terminals 142P. 142N. When the switching element 114 is driven by a drive signal from a buffer integrated circuit that buffers the drive signal, the power-off circuitry 121 may be configured to disconnect the switching element 114 from the buffer integrated circuit by disconnecting the pair of power-off output terminals 142P, 142N. In addition, the power-off circuitry 121 may be configured to both powering down and disconnecting the buffer ICs as described above by disconnecting the pair of power-off output terminals 142P, 142N. As described above, since the pair of power-off input terminals 141P, 141N are connected to the main switch 240 and the power-off output terminals 142P, 142N are connected to the local control circuitry 120, the power off switch 140 allows the output of the power conversion circuitry 110 to continue when the switch drive current is input, and stops the output of the power conversion circuitry 110 when the input of the switch drive current is stopped.

The input cutoff switch 150 includes a pair of cutoff input terminals 151P, 151N and a pair of cutoff output terminals 152P, 152N. The pair of cutoff output terminals 152P, 152N are maintained in a connected state by current input to the pair of input terminals 151P, 151N and are disconnected from each other in response to stop of current input to the pair of cutoff input terminals 151P, 151N. For example, the input cutoff switch 150 is a photocoupler, and further includes a light-emitting element 153 and a light receiving element 154. The light-emitting element 153 emits light by current input to the pair of cutoff input terminals 151P, 151N. The light receiving element 154 is provided between the pair of cutoff output terminals 152P, 152N, maintains the pair of cutoff output terminals 152P, 152N in a connected state with each other when the light-emitting element 153 emits light, and disconnects the pair of cutoff output terminals 152P, 152N from each other when the light emission of the light-emitting element 153 stops. In a series connection of the current source 230, the main switch 240, and the power-off switch 140 and the input cutoff switch 150 of the plurality of power modules 100, the pair of power-off input terminals 141P, 141N and the pair of cutoff output terminals 152P, 152N are connected in series.

The pair of cutoff input terminals 151P, 151N are connected to the local control circuitry 120. The local control circuitry 120 includes internal diagnostic circuitry 122. The internal diagnostic circuitry 122 inputs on-current to the pair of cutoff input terminals 151P, 151N of the input cutoff switch 150 and stops the input of on-current in response to detection of an internal abnormality. The internal abnormality refers to an abnormality occurring inside the power conversion system 1. As described above, since the pair of power-off input terminals 141P, 141N and the pair of cutoff output terminals 152P, 152N are connected in series and the cutoff input terminals 151P, 151N are connected to the local control circuitry 120, the input cutoff switch 150 cuts off the input of the switch drive current to the power-off switch 140 in response to the detection of the internal abnormality.

The power conversion system 1 may further include a second output stop system in addition to the first output stop system configured by the serial connection of the current source 230, the main switch 240, and the power-off switch 140 and the input cutoff switch 150 of the plurality of power modules 100.

For example, the control module 200 further includes a second current source 250 and a second main switch 260. The second current source 250 supplies a switch drive current. The second main switch 260 cuts off the switch drive current supplied by the second current source 250 in response to detection of the external abnormality. The power module 100 further includes a second power-off switch 160 and a second input cutoff switch 170. The second power-off switch 160 is configured to allow the output of the power conversion circuitry 110 to continue when there is an input of the switch drive current, and to stop the output of the power conversion circuitry 110 when the input of the switch drive current stops. The second input cutoff switch 170 cuts off input of the switch drive current to the second power-off switch 160 in response to detection of the internal abnormality. The second current source 250, the second main switch 260, and the second power-off switch 160 and the second input cutoff switch 170 of the plurality of power modules 100 are connected in series. Thus, the above-described second output stop system is configured.

Similarly to the current source 230, the second current source 250 includes a positive terminal 251 and a negative terminal 252 and supplies a second switch drive current to a circuit connected to the positive terminal 251 and the negative terminal 252. The second current source 250 may be a constant current source that supplies a constant second switch drive current.

Similarly to the main switch 240, the second main switch 260 includes a pair of input terminals 261P, 261N and a pair of output terminals 262P, 262N. The pair of output terminals 262P, 262N are maintained in a connected state by current input to the pair of input terminals 261P, 261N and are cut off from each other in response to stop of current input to the pair of input terminals 261P, 261N. For example, the second main switch 260 is a photocoupler, and further includes a light-emitting element 263 and a light receiving element 264. The light-emitting element 263 emits light by current input to the pair of input terminals 261P, 261N. The light receiving element 264 is provided between the pair of output terminals 262P, 262N, maintains the pair of output terminals 262P, 262N in a connected state with each other when the light-emitting element 263 emits light, and disconnects the pair of output terminals 262P, 262N from each other when the light emission of the light-emitting element 263 stops. The pair of output terminals 262P, 262N are connected in series to the second current source 250. For example, the output terminal 262P is connected to the positive terminal 251 of the second current source 250 and the output terminal 262N is connected to the first connector 221.

A pair of the input terminals 261P, 261N are connected to a second sensor 12. The second sensor 12 is a sensor that detects the external abnormality. For example, the second sensor 12 is an object sensor, and detects entry of an object (including a human body) into the above-described predetermined region as the external abnormality. For this reason, the second sensor 12 detects the same external abnormality as the external abnormality that the first sensor 11 detects. The second sensor 12 inputs on-current to the input terminals 261P, 261N when the external abnormality is not detected, and stops input of on-current to the input terminals 261P, 261N when the external abnormality is detected. Thus, the second main switch 260 cuts off switch drive current supplied by the second current source 250 in response to detection of the external abnormality.

Similarly to the power-off switch 140, the second power-off switch 160 includes a pair of power-off input terminals 161P, 161N and a pair of power-off output terminals 162P, 162N. The pair of power-off output terminals 162P, 162N are maintained in a state of being connected to each other by current input to the pair of power-off input terminals 161P, 161N, and are disconnected from each other in response to stop of current input to the pair of power-off input terminals 161P, 161N. For example, the second power-off switch 160 is a photocoupler, and further includes a light-emitting element 163 and a light receiving element 164. The light-emitting element 163 emits light by current input to the pair of power-off input terminals 161P, 161N. The light receiving element 164 is provided between the pair of power-off output terminals 162P, 162N, maintains the pair of power-off output terminals 162P, 162N in a connected state to each other when the light-emitting element 163 emits light, and disconnects the pair of power-off output terminals 162P, 162N from each other in response to the stop of the light emission of the light-emitting element 163. In a series connection of the second current source 250, the second main switch 260, and the second power-off switch 160 and the second input cutoff switch 170 of the plurality of power modules 100, the pair of power-off input terminals 161P, 161N are connected to the second main switch 260.

The pair of power-off output terminals 162P, 162N are connected to the local control circuitry 120. The power-off circuitry 121 stops the output from the power conversion circuitry 110 also when the pair of power-off output terminals 162P, 162N are disconnected from each other. For example, when the pair of power-off output terminals 162P, 162N are disconnected from each other, the power-off circuitry 121 turns off all the switching element 114 of the inverter circuitry 113 and disconnects the output lines 115U, 115V, 115W from the DC buses 111P, 111N. In this way, since the pair of power-off input terminals 161P, 161N is connected to the second main switch 260 and the power-off output terminals 162P, 162N are connected to the local control circuitry 120, the second power-off switch 160 allows the output of the power conversion circuitry 110 to continue when the input of the second switch drive current is present, and stops the output of the power conversion circuitry 110 when the input of the second switch drive current is stopped.

The second input cutoff switch 170 includes a pair of cutoff input terminals 171P, 171N and a pair of cutoff output terminals 172P, 172N. The pair of cutoff output terminals 172P, 172N are maintained in a connected state by current input to the pair of cutoff input terminals 171P, 171N and are disconnected from each other in response to stop of current input to the pair of cutoff input terminals 171P, 171N. For example, the second input cutoff switch 170 is a photocoupler, and further includes a light-emitting element 173 and a light receiving element 174. The light-emitting element 173 emits light by current input to the pair of cutoff input terminals 171P, 171N. The light receiving element 174 is provided between the pair of cutoff output terminals 172P, 172N, maintains the pair of cutoff output terminals 172P, 172N in a connected state with each other when the light-emitting element 173 emits light, and disconnects the pair of cutoff output terminals 172P, 172N from each other when the light emission of the light-emitting element 173 stops. In a series connection of the second current source 250, the second main switch 260, and the second power-off switch 160 and the second input cutoff switch 170 of the plurality of power modules 100, the pair of power-off input terminals 161P, 161N and the pair of cutoff output terminals 172P, 172N are connected in series.

The pair of cutoff input terminals 171P, 171N are connected to the local control circuitry 120. The internal diagnostic circuitry 122 inputs on-current to the pair of cutoff input terminals 171P, 171N of the second input cutoff switch 170 and stops the input of on-current in response to detection of the internal abnormality. As described above, since the pair of power-off input terminals 161P, 161N and the pair of cutoff output terminals 172P, 172N are connected in series and the cutoff input terminals 171P, 171N are connected to the local control circuitry 120, the second input cutoff switch 170 cuts off the input of the switch drive current to the second power-off switch 160 in response to the detection of the internal abnormality.

As described above, if the power conversion system 1 includes the first output stop system and the second output stop system, the internal diagnostic circuitry 122 may diagnose whether there is the internal abnormality based on the comparison between the status of the power-off switch 140 of the first output stop system and the status of the second power-off switch 160 of a second output stop system. As described above, the first sensor 11 and the second sensor 12 detect the same external abnormality. Therefore, it is assumed that the status of the power-off switch 140 and the status of the second power-off switch 160 are always the same. Accordingly, the internal diagnostic circuitry 122 diagnoses that there is no internal abnormality when the status of the power-off switch 140 is equal to the status of the second power-off switch 160, and diagnoses that there is an internal abnormality when the status of the power-off switch 140 is different from the status of the second power-off switch 160. For example, the internal diagnostic circuitry 122 diagnoses that there is the internal abnormality when the power-off output terminals 162P, 162N are disconnected from each other despite the power-off output terminals 142P, 142N being connected, or when the power-off output terminals 162P, 162N are connected despite the power-off output terminals 142P, 142N being disconnected from each other.

When the internal abnormality is detected, the internal diagnostic circuitry 122 stops inputting on-current to the cutoff input terminals 151P, 151N and also stops inputting on-current to the cutoff input terminals 171P, 171N. Therefore, when the internal diagnostic circuitry 122 diagnoses that there is the internal abnormality, the input cutoff switch 150 cuts off the input of the switch drive current to the power-off switch 140, and the second input cutoff switch 170 cuts off the input of the switch drive current to the second power-off switch 160.

The power conversion system 1 may be configured such that the power-off switch 140 and the input cutoff switch 150 of the plurality of power modules 100 connected to the first connector 221 are connected in series to the current source 230 and the main switch 240 by the first daisy chain. The power conversion system 1 may also be configured such that the second power-off switch 160 and the second input cutoff switch 170 of the plurality of power modules 100 connected to the first connector 221 are connected in series to the second current source 250 and the second main switch 260 by the first daisy chain. For example, in each of the plurality of power modules 100, the first connector 131 is connected to the power-off input terminal 141P and the power-off input terminal 161P, and the second connector 132 is connected to the cutoff output terminal 152N and the cutoff output terminal 172N. Each of the plurality of power modules 100 further includes a return line 133 and a second return line 134. The return line 133 returns the switch drive current from the second connector 132 to the first connector 131. The second return line 134 returns a second switch drive current from the second connector 132 to the first connector 131.

As mentioned above, the first connector 131 of the direct connection module 101 is connected to the first connector 221 by the cable harness 300. The cable harness 300 includes electric wires 321, 322, 323, 324. The electric wire 321 sends the switch drive current from the first connector 221 to the first connector 131, and the electric wire 322 returns the switch drive current from the first connector 131 to the first connector 221. The electric wire 321 is connected to the output terminal 242N of the main switch 240 by connection of the connector 311 and the first connector 221, and is connected to the power-off input terminal 141P of the power-off switch 140 by connection of the connector 312 and the first connector 131. Thus, the first connector 131 receives the switch drive current. The electric wire 322 is connected to the negative terminal 232 of the current source 230 by connecting the connector 311 and the first connector 221, and is connected to the return line 133 by connecting the connector 312 and the first connector 131.

The electric wire 323 sends the second switch drive current from the first connector 221 to the first connector 131 and the electric wire 324 returns the second switch drive current from the first connector 131 to the first connector 221. The electric wire 323 is connected to the output terminal 262N of the second main switch 260 by connection of the connector 311 and the first connector 221, and is connected to the power-off input terminal 161P of the second power-off switch 160 by connection of the connector 312 and the first connector 131. Therefore, the first connector 131 receives the second switch drive current. The electric wire 324 is connected to the negative terminal 252 of the second current source 250 by connecting the connector 311 and the first connector 221, and is connected to the second return line 134 by connecting the connector 312 and the first connector 131.

As mentioned above, the first connector 131 of the indirect connection module 102 is connected by the cable harness 400 to the second connector 132 of the other power module 100 (the direct connection module 101 or the indirect connection module 102). The cable harness 400 includes electric wires 421, 422, 423, 424. The electric wire 421 sends the switch drive current from the second connector 132 of the other power module 100 to the first connector 131 of the indirect connection module 102, and the electric wire 422 returns the switch drive current from the first connector 131 of the indirect connection module 102 to the second connector 132 of the other power module 100. The electric wire 421 is connected to the cutoff output terminal 152N of the input cutoff switch 150 by a connection between a connector 411 and the second connector 132 of the other power module 100, and connected to the power-off input terminal 141P of the power-off switch 140 by a connection between a connector 412 and the first connector 131 of the indirect connection module 102. Thus, the second connector 132 of the other power module 100 outputs the switch drive current that passes through the power-off switch 140 and the input cutoff switch 150, and the first connector 131 of the indirect connection module 102 receives the switch drive current that passes through the other power module 100. The electric wire 422 is connected to the return line 133 of the other power module 100 by a connection between the connector 411 and the second connector 132 of the other power module 100, and connected to the return line 133 of the indirect connection module 102 by a connection between the connector 412 and the first connector 131 of the indirect connection module 102.

The electric wire 423 sends the second switch drive current from the second connector 132 of the other power module 100 to the first connector 131 of the indirect connection module 102, and the electric wire 424 returns the second switch drive current from the first connector 131 of the indirect connection module 102 to the second connector 132 of the other power module 100. The electric wire 423 is connected to the cutoff output terminal 172N of the second input cutoff switch 170 by a connection between the connector 411 and the second connector 132 of the other power module 100, and connected to the power-off input terminal 161P of the second power-off switch 160 by a connection between the connector 412 and the first connector 131 of the indirect connection module 102. Thus, the second connector 132 of the other power module 100 outputs the second switch drive current that passes through the second power-off switch 160 and the second input cutoff switch 170, and the first connector 131 of the indirect connection module 102 receives the second switch drive current that passes through the other power module 100. The electric wire 424 is connected to the second return line 134 of the other power module 100 by a connection between the connector 411 and the second connector 132 of the other power module 100, and connected to the second return line 134 of the indirect connection module 102 by a connection between the connector 412 and the first connector 131 of the indirect connection module 102.

The one or more indirect connection module 102 includes a termination module 103 that terminates the first daisy chain. The termination module 103 is a module that does not serve as the "other power module 100" described above. A termination connector 190 is connected to the second connector 132 of the termination module 103. The termination connector 190 returns the switch drive current output from the second connector 132 to the return line 133 and returns the second switch drive current output from the second connector 132 to the second return line 134. For example, the termination connector 190 includes a short-circuit line 191 and a second short-circuit line 192. The short-circuit line 191 connects the cutoff output terminal 152N of the input cutoff switch 150 and the return line 133 via the second connector 132. The second short-circuit line 192 connects the cutoff output terminal 172N of the second input cutoff switch 170 and the second return line 134 via the second connector 132.

As described above, the current source 230, the main switch 240, and the power-off switch 140 and the input cutoff switch 150 of the plurality of power modules 100 are connected in series. The power conversion system 1 may be configured such that the power-off switch 140 and the input cutoff switch 150 of the plurality of power modules 100 connected to the second connector 222 are connected in series to the current source 230 and the main switch 240 by the second daisy chain. The power conversion system 1 may also be configured such that the second power-off switch 160 and the second input cutoff switch 170 of the plurality of power modules 100 connected to the second connector 222 are connected in series to the second current source 250 and the second main switch 260 by the second daisy chain.

Figure 4:
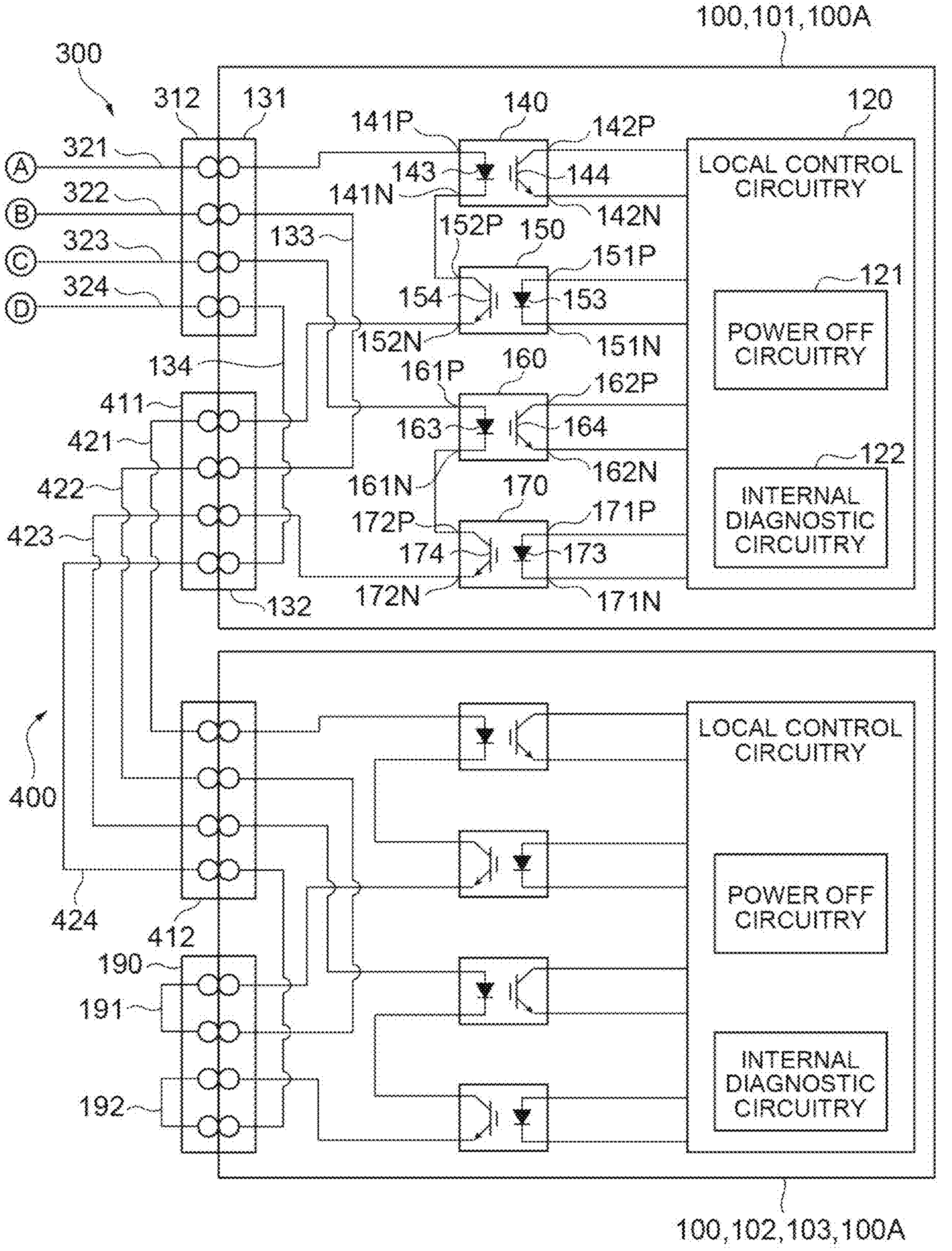
FIG. 4 is a block diagram illustrating an example output stop system configured by a second daisy chain.

FIGS. 2 and 4 illustrate an output stop system configured by a second daisy chain. As illustrated in FIGS. 2 and 4, the plurality of power modules 100 are connected to the second connector 222 by the cable harness 300 and the cable harness 400. As an example, in the illustrated second daisy chain, two power modules 100 are connected to the second connector 222. Therefore, the second the indirect connection module 102 from the second connector 222 is the termination module 103. In the connection of the plurality of power modules 100 to the second connector 222, the first connector 131 of the direct connection module 101 is connected to the second connector 222 by the cable harness 300. The first connector 131 of the indirect connection module 102 (the termination module 103 in the drawings) is connected to the second connector 132 of the other power module 100 (the direct connection module 101 in the figure) by the cable harness 400. The termination connector 190 is connected to the second connector 132 of the termination module 103.

For example, the control module 200 further includes a relay line 271, a return line 272, a relay line 274, and a return line 275. The relay line 271 outputs the switch drive current returned to the first connector 221 by the electric wire 322 to the electric wire 321 of the cable harness 300 connected to the second connector 222. The return line 272 returns the switch drive current returned to the second connector 222 by the electric wire 322 to the negative terminal 232 of the current source 230. As a result, the current source 230, the main switch 240, the power-off switch 140 and the input cutoff switch 150 of the power module 100 of the first daisy chain, and the power-off switch 140 and the input cutoff switch 150 of the power module 100 of the second daisy chain are connected in series.

The relay line 274 outputs the second switch drive current returned to the first connector 221 by the electric wire 324 to the electric wire 323 of the cable harness 300 connected to the second connector 222. The return line 275 returns the second switch drive current returned to the second connector 222 by the electric wire 324 to the negative terminal 252 of the second current source 250. As a result, the second current source 250, the second main switch 260, the second power-off switch 160 and the second input cutoff switch 170 of the power module 100 of the first daisy chain, and the second power-off switch 160 and the second input cutoff switch 170 of the power module 100 of the second daisy chain are connected in series.

Further, the power conversion system 1 may be configured such that the power-off switch 140 and the input cutoff switch 150 of the plurality of secondary power modules 100B are connected in series with the current source 230, the main switch 240, and the power-off switch 140 and the input cutoff switch 150 of the plurality of primary power modules 100A by the secondary control module 200B and the cable harness 500. The power conversion system 1 may also be configured such that the second power-off switch 160 and the second input cutoff switch 170 of the plurality of secondary power modules 100B are connected in series with the second current source 250, the second main switch 260, and the second power-off switch 160 and the second input cutoff switch 170 of the plurality of primary power modules 100A by the secondary control module 200B and the cable harness 500.

Figure 5:
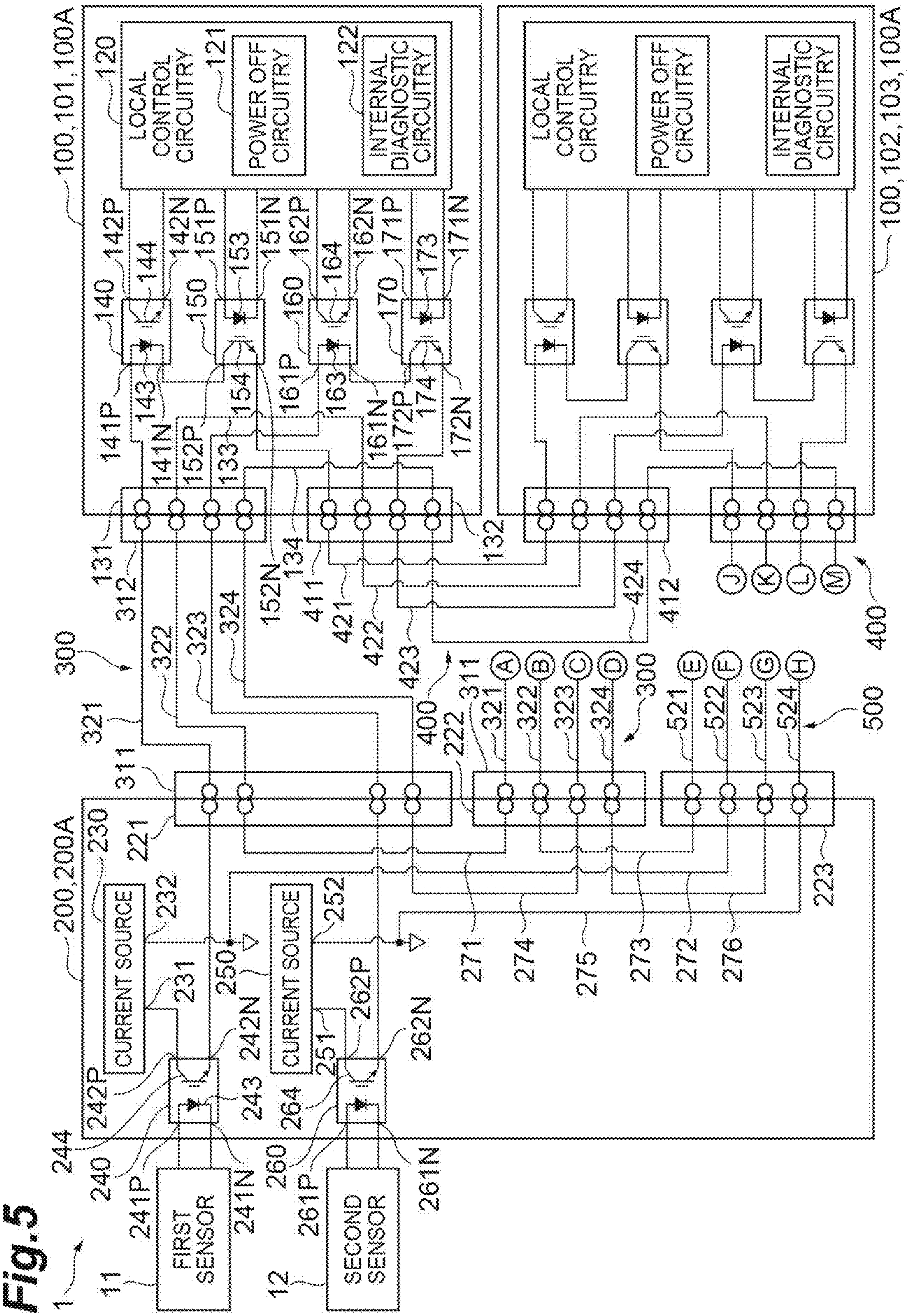
FIG. 5 is a block diagram illustrating an example output stop system configured via a secondary control module.
Figure 6:
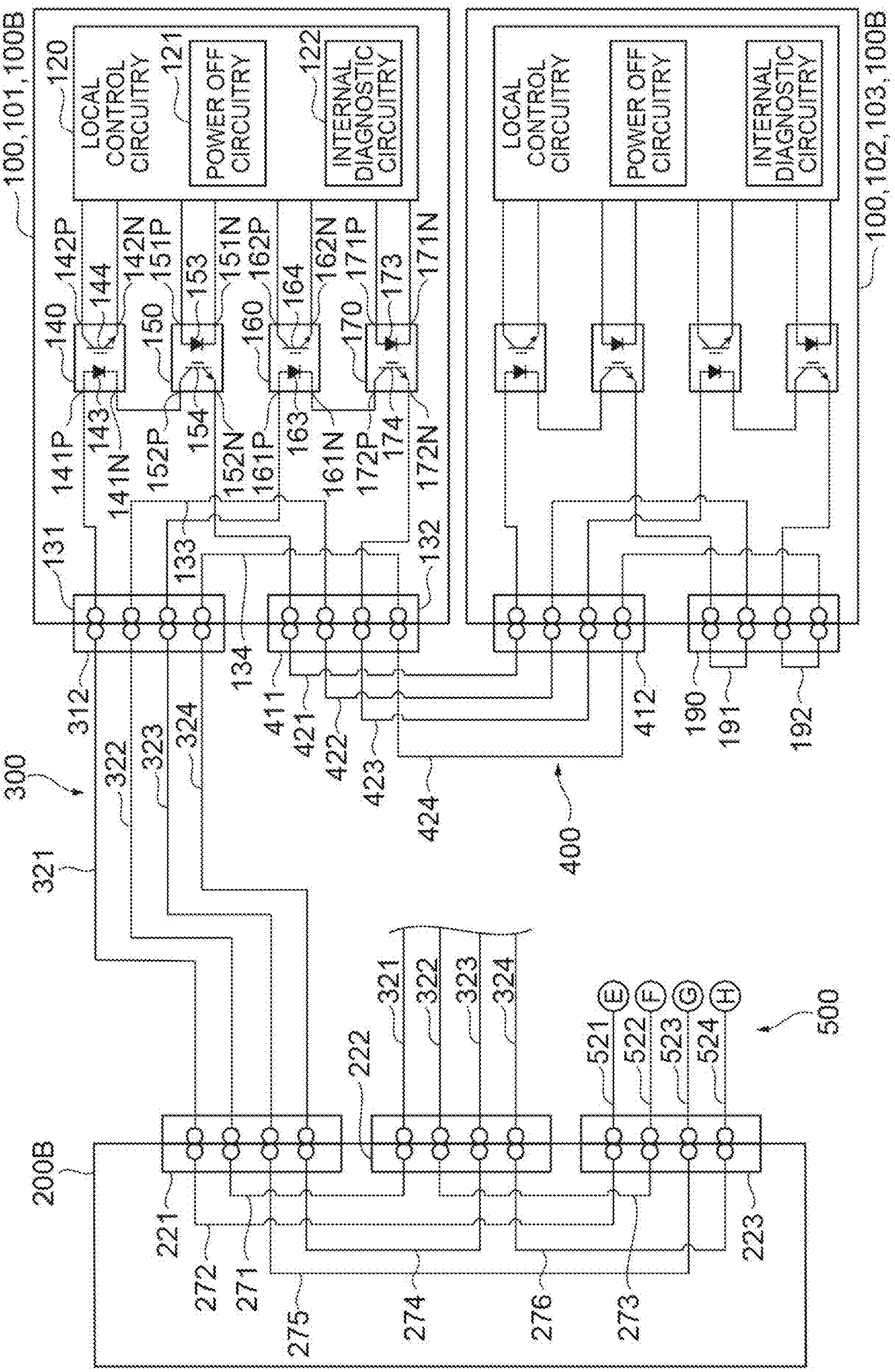
FIG. 6 is a block diagram illustrating an example output stop system configured via the secondary control module.

FIGS. 5 and 6 are block diagrams illustrating an example output stop system configured via the secondary control module 200B. As illustrated in FIGS. 5 and 6, the cable harness 500 includes electric wires 521, 522, 523, 524. The electric wire 521 sends the switch drive current from the third connector 223 of the primary control module 200A to the third connector 223 of the secondary control module 200B and the electric wire 522 returns the switch drive current from the third connector 223 of the secondary control module 200B to the third connector 223 of the primary control module 200A. The electric wire 523 sends the second switch drive current from the third connector 223 of the primary control module 200A to the third connector 223 of the secondary control module 200B, and the electric wire 524 returns the second switch drive current from the third connector 223 of the secondary control module 200B to the third connector 223 of the primary control module 200A.

The primary control module 200A further includes relay lines 273, 276 in addition to the relay lines 271, 274 described above. The relay line 273 outputs the switch drive current returned to the second connector 222 by the electric wire 322 to the electric wire 521 of the cable harness 500 connected to the third connector 223. The return line 272 returns, to the negative terminal 232 of the current source 230, the switch drive current returned to the second connector 222 by the electric wire 322, output to the electric wire 521 by the relay line 273, and returned to the third connector 223 by the electric wire 522. The relay line 276 outputs the second switch drive current returned to the second connector 222 by the electric wire 324 to the electric wire 523 of the cable harness 500 connected to the third connector 223. The return line 275 returns, to the negative terminal 252 of the second current source 250, the second switch drive current returned to the second connector 222 by the electric wire 324, output to the electric wire 523 by the relay line 276, and returned to the third connector 223 by the electric wire 524.

As illustrated in FIG. 6, in the secondary control module 200B, the current source 230, the main switch 240, the second current source 250, and the second main switch 260 are not connected to the first connector 221. In the first connector 221, the electric wire 321 of the cable harness 300 is connected to the return line 272 and the electric wire 323 of the cable harness 300 is connected to the return line 275. In the third connector 223, the electric wire 521 is connected to the return line 272 and the electric wire 523 is connected to the return line 275. The electric wire 522 is connected to the relay line 273 and the electric wire 524 is connected to the relay line 276. Thus, the switch drive current sent to the secondary control module 200B by the electric wire 521 is output from the first connector 221 to the electric wire 321 of the cable harness 300. The switch drive current returned to the first connector 221 by the electric wire 322 is output by the relay line 271 to the electric wire 321 of the cable harness 300 connected to the second connector 222. The switch drive current returned to the second connector 222 by the electric wire 322 is returned by the relay line 273 to the electric wire 522 of the cable harness 500 connected to the third connector 223.

The second switch drive current sent by the electric wire 523 to the secondary control module 200B is output from the first connector 221 to the electric wire 323 of the cable harness 300. The second switch drive current returned to the first connector 221 by the electric wire 324 is output by the relay line 274 to the electric wire 323 of the cable harness 300 connected to the second connector 222. The second switch drive current returned to the second connector 222 by the electric wire 324 is returned by the relay line 276 to the electric wire 524 of the cable harness 500 connected to the third connector 223. As described above, the current source 230, the main switch 240, the power-off switch 140 and the input cutoff switch 150 of the plurality of primary power modules 100A, and the power-off switch 140 and the input cutoff switch 150 of the plurality of secondary power modules 100B are connected in series. The second current source 250, the second main switch 260, the second power-off switch 160 and the second input cutoff switch 170 of the plurality of primary power modules 100A, the second power-off switch 160 and the second input cutoff switch 170 of the plurality of secondary power modules 100B are connected in series.

Figure 7:
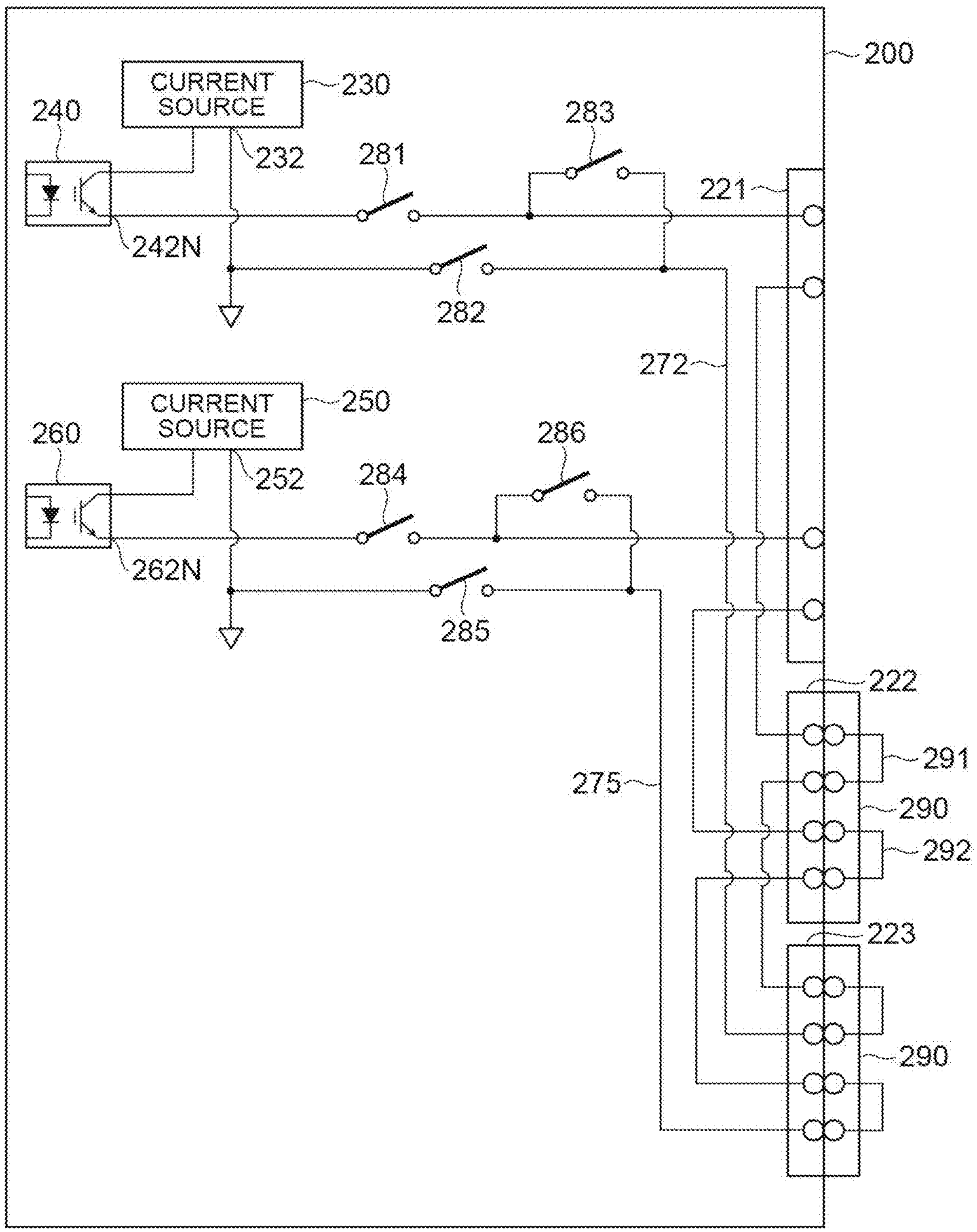
FIG. 7 is a diagram illustrating an example control module.

The control module 200 may be configured to switch between a primary mode usable as the primary control module 200A and a secondary mode usable as the secondary control module 200B. For example, as illustrated in FIG. 7, the control module 200 further includes mode switches 281, 282, 283 and mode switches 284, 285, 286. The mode switch 281 connects the output terminal 242N of the main switch 240 to the first connector 221 in the primary mode and disconnects the output terminal 242N from the first connector 221 in the secondary mode. The mode switch 282 connects the return line 272 to the negative terminal 232 of the current source 230 in the primary mode and disconnects the return line 272 from the negative terminal 232 in the secondary mode. The mode switch 283 connects the return line 272 to the first connector 221 in the secondary mode and disconnects the return line 272 from the first connector 221 in the primary mode.

The mode switch 284 connects the output terminal 262N of the second main switch 260 to the first connector 221 in the primary mode and disconnects the output terminal 262N from the first connector 221 in the secondary mode. The mode switch 285 connects the return line 275 to the negative terminal 252 of the second current source 250 in the primary mode and disconnects the return line 275 from the negative terminal 252 in the secondary mode. The mode switch 286 connects the return line 275 to the first connector 221 in the secondary mode and isolates the return line 275 from the first connector 221 in the primary mode. As described above, the hardware configurations of the primary control module 200A and the secondary control module 200B may be unified and the production efficiency of the power conversion system 1 may be improved.

Depending on the number of the power modules 100 to be used, the power module 100 may not be connected to the first connector 221 or the second connector 222 in the primary control module 200A or the secondary control module 200B. A termination connector 290 may be connected to the first connector 221 or the second connector 222 to which the power module 100 is not connected. In addition, if the power conversion system 1 does not have the secondary control module 200B, the termination connector 290 may be connected to the third connector 223 of the primary control module 200A. For example, the termination connector 290 includes a short-circuit line 291 and a second short-circuit line 292. The short-circuit line 291 returns the switch drive current output from the connection destination connector (the first connector 221, the second connector 222, or the third connector 223) to the connection destination connector. The second short-circuit line 292 returns the second switch drive current output from the connection destination connector to the connection destination connector.

The power conversion system 1 includes: the plurality of power modules 100 configured to output power; and the control module connected to the plurality of power modules 100. The control module includes: the current source 230 configured to supply a switch drive current; and the main switch 240 configured to cut off the switch drive current supplied by the current source 230 in response to detection of an external abnormality. Each of the power modules 100 includes: the power conversion circuitry 110 configured to output power; the power-off switch 140 configured to allow the output of the power conversion circuitry 110 to continue when the switch drive current is input, and to stop the output of the power conversion circuitry 110 when the input of the switch drive current stops; and the input cutoff switch 150 configured to cut off input of the switch drive current to the power-off switch 140 in response to detection of an internal abnormality. The current source 230, the main switch 240, and the power-off switch 140 and the input cutoff switch 150 of the plurality of power modules 100 are connected in series.

According to this power conversion system 1, the plurality of power modules 100 may be collectively stopped with reliability by a simple configuration in which the current source 230, the main switch 240, and the power-off switch 140 and the input cutoff switch 150 of the plurality of power modules 100 are connected in series. For example, when an external abnormality occurs, the switch drive current for the plurality of power modules 100 is cut off by the main switch 240, so that the output of the plurality of power modules 100 can be stopped collectively. When an internal abnormality occurs in any of the plurality of power modules 100, the switch drive current to the plurality of power modules 100 is cut off by the input cutoff switch 150, so that output of the plurality of power modules 100 can be stopped collectively. Therefore, both reliability of collectively stopping the plurality of power modules 100 and simplification of the system may be achieved.

The power-off switch 140 includes: the pair of power-off input terminals 141P, 141N; and the pair of power-off output terminals 142P, 142N maintained in a connected state with respect to each other by the input of switch drive current to the pair of power-off input terminals 141P, 141N, and disconnected from each other in response to the input of switch drive current to the pair of power-off input terminals 141P, 141N being stopped. The input cutoff switch 150 includes: the pair of cutoff input terminals 151P, 151N; and the pair of cutoff output terminals 152P, 152N maintained in a connected state with respect to each other by the input of an on-current to the pair of cutoff input terminals 151P, 151N, and disconnected from each other in response to the input of the on-current to the pair of cutoff input terminals 151P, 151N being stopped. In a series connection of the current source 230, the main switch 240, and the power-off switch 140 and the input cutoff switch 150 of the plurality of power modules 100, the pair of power-off input terminals 141P, 141N and the pair of cutoff output terminals 152P, 152N may be connected in series. Similarly configured switches can be used for the power-off switch 140 and the input cutoff switch 150.

Each of the plurality of power modules 100 may further include: the power-off circuitry 121 configured to stop output from the power conversion circuitry 110 when the pair of power-off output terminals 142P, 142N are disconnected from each other; and the internal diagnostic circuitry 122 configured to input on-current to the pair of cutoff input terminals 151P, 151N, and to stop input of on-current in response to detection of the internal abnormality. By simplifying the power-off switch 140 and the input cutoff switch 150, reliability can be further increased.

Each of the plurality of power modules 100 may further include: the first connector 131 configured to receive switch drive current supplied by the current source 230; the second connector 132 configured to output switch drive current that passes through the power-off switch 140 and the input cutoff switch 150; and the return line 133 configured to return switch drive current from the second connector 132 to the first connector 131. The plurality of power modules 100 may include: one direct connection module, the first connector 131 of the one direct connection module being connected to the current source 230 of the power module 100; and one or more indirect connection modules, the first connector 131 of the one or more indirect connection modules being connected to the second connector 132 of another power module 100. Wiring for connecting the current source 230, the main switch 240, and the power-off switch 140 and the input cutoff switch 150 of the plurality of power modules 100 in series can be simplified.

The one or more indirect connection modules may include a termination module that does not serve as the other power module 100. The termination connector 190 configured to return, to the return line 133, the switch drive current output from the second connector 132 may be connected to the second connector 132 of the termination module. A supply route for supplying switch drive current to the power-off switch 140 and the input cutoff switch 150 of the plurality of power modules 100 and a return route constituted of the return line 133 of the plurality of power modules 100 can readily be connected by the termination connector 190. Therefore, the wiring can be further simplified.

The current source 230 may be a constant current source. A more stable switch drive current can be supplied to the power-off switch 140 and the input cutoff switch 150 of the plurality of power modules 100.

The control module may include: the second current source 250 configured to supply a second switch drive current; and the second main switch 260 configured to cut off the second switch drive current supplied by the second current source 250 in response to detection of the external abnormality. Each of the plurality of power modules 100 may include: the second power-off switch 160 configured to allow the output of the power conversion circuitry 110 to continue when the second switch drive current is input, and to stop the output of the power conversion circuitry 110 when the input of the second switch drive current is stopped; and the second input cutoff switch 170 configured to cut off input of the second switch drive current to the second power-off switch 160 in response to detection of the internal abnormality. The second current source 250, the second main switch 260, and the second power-off switch 160 and the second input cutoff switch 170 of the plurality of power modules 100 may be connected in series. By doubling the system for stopping the output from the power conversion circuitry 110 in response to the external abnormality or the internal abnormality, the reliability of the collective stopping of the plurality of power modules 100 may further be improved.

By doubling the system for stopping the output from the power conversion circuitry 110 in accordance with the external abnormality or the internal abnormality, SIL2 of Part 7 of IEC 61508 can be satisfied.

Each of the plurality of power modules 100 may further include the internal diagnostic circuitry 122 configured to diagnose whether there is the internal abnormality based on a comparison between the status of the power-off switch 140 and the status of the second power-off switch 160. When the internal diagnostic circuitry 122 diagnoses that there is the internal abnormality, the input cutoff switch 150 may be configured to cut off the input of the switch drive current to the power-off switch 140, and the second input cutoff switch 170 may be configured to cut off the input of the switch drive current to the second power-off switch 160. The internal abnormality may be more surely detected by a simple logic.

By diagnosing whether there is the internal abnormality based on the comparison between the status of the power-off switch 140 and the status of the second power-off switch 160, the mutual monitoring of the double output stop systems is realized, so SIL3 of Part 7 of IEC 61508 may be satisfied.

Each of the plurality of power modules 100 may further include: the first connector 131 connected to the control module and configured to receive the switch drive current supplied by the current source 230 and the second switch drive current supplied by the second current source 250; the second connector 132 configured to output the switch drive current that passes through the power-off switch 140 and the input cutoff switch 150 and the second switch drive current that passes through the second power-off switch 160 and the second input cutoff switch 170; the return line 133 configured to return the switch drive current from the second connector 132 to the first connector 131; and the second return line 134 configured to return the second switch drive current from the second connector 132 to the first connector 131. The plurality of power modules 100 may include: one direct connection module, the first connector 131 of the one direct connection module being connected to the current source 230 of the power module 100; and one or more indirect connection modules, the first connector 131 of the one or more indirect connection modules being connected to the second connector 132 of the other power module 100. Wiring for connecting the current source 230, the main switch 240, the power-off switch 140 and the input cutoff switch 150 of the plurality of power modules 100 in series, and wiring for connecting the second current source 250, the second main switch 260, the second power-off switch 160 and the second input cutoff switch 170 of the plurality of power modules 100 in series can be simplified.

The one or more indirect connection modules may include a termination module that does not serve as the other power module 100. The termination connector 190 configured to return the switch drive current output from the second connector 132 to the return line 133 and to return the second switch drive current output from the second connector 132 to the second return line 134 may be connected to the second connector 132 of the termination module. A supply route for supplying the switch drive current to the power-off switch 140 and the input cutoff switch 150 of the plurality of power modules 100 and a return route constituted by the return line 133 of the plurality of power modules 100 can readily be connected by the termination connector 190. Further, a second supply route for supplying the second switch drive current to the second power-off switch 160 and the second input cutoff switch 170 of the plurality of power modules 100 and the second return route constituted by the second return line 134 of the plurality of power modules 100 can readily be connected by the termination connector 190. Therefore, the wiring can be further simplified.

It may further include the secondary control module 200B. The plurality of power modules 100 may include: the plurality of primary power modules 100A controlled by the control module without interposing the secondary control module 200B and the one or more secondary power modules 100B controlled by the control module via the secondary control module 200B. The power-off switch 140 and the input cutoff switch 150 of the one or more secondary power modules 100B may be connected in series with the current source 230, the main switch 240, and the power-off switch 140 and the input cutoff switch 150 of the plurality of primary power modules 100A via the secondary control module 200B. Wiring for connecting the current source 230, the main switch 240, and the power-off switch 140 and the input cutoff switch 150 of the plurality of power modules 100 in series may be simplified even in a configuration in which the secondary control module 200B exists.

The main switch 240 may be provided between the negative terminal 232 and the return line 272 instead of between the positive terminal 231 and the first connector 221. The second main switch 260 may be provided between the negative terminal 252 and the return line 275 instead of between the positive terminal 251 and the first connector 221. Further, in each power module 100, the connection order of the power-off switch 140 and the input cutoff switch 150 may be reversed. The control module 200 may be divided into a plurality of modules. For example, the control module 200 may be divided into a control module for power conversion control including the main control circuitry 210 and a control module for cutoff control including the current source 230, the main switch 240, the second current source 250, and the second main switch 260.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power conversion system comprising:
- a plurality of power modules; and
- a control module connected to the plurality of power modules,
- wherein the control module comprises:
  - a current source configured to supply a switch drive current; and
  - a main switch configured to cut off the switch drive current supplied by the current source in response to an external abnormality detected outside the power conversion system,
- wherein each module of the plurality of power modules comprises:
  - power conversion circuitry configured to output electric power;
  - a power-off switch configured to cut off the electric power from the power conversion circuitry in response to a disappearance of the switch drive current supplied by the current source; and
  - an input cutoff switch configured to cut off the switch drive current to the power-off switch in response to an internal abnormality detected inside the module,
- wherein the power-off switch is configured to:
  - shorten a pair of power-off output terminals in response to an appearance of the switch drive current between a pair of power-off input terminals; and
  - open the pair of power-off output terminals in response to the disappearance of the switch drive current between the pair of power-off input terminals,
- wherein the input cutoff switch is configured to:
  - shorten a pair of cutoff output terminals in response to an appearance of an on-current between a pair of cutoff input terminals, the on-current indicating an absence of the internal abnormality; and
  - open the pair of cutoff output terminals in response to a disappearance of the on-current between the pair of cutoff input terminals,
- wherein the current source, the main switch, and the power-off switch and the input cutoff switch for each of the plurality of power modules are serially connected to each other to form a series connection among the plurality of power modules, and
- wherein one of the pair of power-off input terminals and one of the pair of cutoff output terminals are connected to each other in the series connection.

2. The power conversion system according to claim 1, wherein each of the plurality of power modules further comprises:
- power-off circuitry configured to stop output from the power conversion circuitry in response to the pair of power-off output terminals being opened; and
- internal diagnostic circuitry configured to:
  - supply the on-current between the pair of cutoff input terminals; and
  - stop supplying the on-current in response to detecting the internal abnormality.

3. The power conversion system according to claim 1, wherein each of the plurality of power modules further comprises:
- a first connector configured to receive the switch drive current supplied by the current source;
- a second connector configured to output the switch drive current that has passed through the power-off switch and the input cutoff switch; and
- a return line configured to return the switch drive current from the second connector to the first connector.

4. The power conversion system according to claim 3, wherein the plurality of power modules comprises:
- one direct connection module, the first connector of the one direct connection module being connected to the current source of the control module; and
- one or more indirect connection modules, the first connector of each of the one or more indirect connection modules being connected to the second connector of another power module.

5. The power conversion system according to claim 4, wherein the one or more indirect connection modules include a termination module that is not the other power module, and
- wherein a termination connector is connected to the second connector of the termination module, the termination connector being configured to pass the switch drive current from the second connector to the return line.

6. The power conversion system according to claim 1, wherein the current source is a constant current source.

7. The power conversion system according to claim 1, wherein the main switch is configured to cut off the switch drive current supplied by the current source in response to an input from an external sensor configured to detect the external abnormality.

8. The power conversion system according to claim 1, further comprising a secondary control module,
- wherein the plurality of power modules comprises:
  - a plurality of primary power modules connected to the control module; and
  - one or more secondary power modules connected to the secondary control module, and
- wherein the secondary control module is connected to the control module so that the current source, the main switch, the power-off switch and the input cutoff switch for each of the plurality of primary power modules, and the one or more secondary power modules are serially connected to each other so as to form the series connection among the plurality of primary power modules and the one or more secondary power modules.

9. The power conversion system according to claim 1, wherein the plurality of power modules comprises a first power module including a first power-off switch and a first input cutoff switch, and a second power module including a second power-off switch and a second input cutoff switch, and wherein the current source, the main switch, the first power-off switch, the first input cutoff switch, the second power-off switch, and the second input cutoff switch are connected in series in the series connection.

10. A system comprising:

the power conversion system according to claim 1; and a motor driven by the electric power supplied from the plurality of power modules.

11. A power conversion system comprising:

a plurality of power modules; and a control module connected to the plurality of power modules, wherein the control module comprises:

a current source configured to supply a switch drive current; and a main switch configured to cut off the switch drive current supplied by the current source in response to an external abnormality detected outside the power conversion system, wherein each module of the plurality of power modules comprises:

power conversion circuitry configured to output electric power;

a power-off switch configured to cut off the electric power from the power conversion circuitry in response to a disappearance of the switch drive current supplied by the current source; and an input cutoff switch configured to cut off the switch drive current to the power-off switch in response to an internal abnormality detected inside the module, wherein the current source, the main switch, and the power-off switch and the input cutoff switch for each of the plurality of power modules are serially connected each other to form a first series connection among the plurality of power modules;

wherein the control module additionally comprises:

a second current source configured to supply a second switch drive current; and a second main switch configured to cut off the second switch drive current supplied by the second current source in response to a second external abnormality detected outside the power conversion system, wherein each module of the plurality of power modules additionally comprises:

a second power-off switch configured to cut off the electric power from the power conversion circuitry in response to a disappearance of the second switch drive current supplied by the second current source; and a second input cutoff switch configured to cut off the second switch drive current to the second power-off switch in response to the internal abnormality, and wherein the second current source, the second main switch, and the second power-off switch and the second input cutoff switch for each of the plurality of power modules are serially connected to each other so as to form a second series connection among the plurality of power modules.

12. The power conversion system according to claim 11, wherein each of the plurality of power modules further comprises internal diagnostic circuitry configured to detect the internal abnormality based on a comparison between a status of the power-off switch and a status of the second power-off switch, wherein the input cutoff switch is configured to cut off the switch drive current to the power-off switch in response to the internal diagnostic circuitry detecting the internal abnormality, and wherein the second input cutoff switch is configured to cut off the second switch drive current to the second power-off switch in response to the internal diagnostic circuitry detecting the internal abnormality.

13. The power conversion system according to claim 11, wherein each of the plurality of power modules further comprises:

a first connector configured to receive the switch drive current supplied by the current source and receive the second switch drive current supplied by the second current source;

a second connector configured to output the switch drive current that has passed through the power-off switch and the input cutoff switch and output the second switch drive current that has passed through the second power-off switch and the second input cutoff switch;

a return line configured to return the switch drive current from the second connector to the first connector; and a second return line configured to return the second switch drive current from the second connector to the first connector.

14. The power conversion system according to claim 13, wherein the plurality of power modules comprise:

one direct connection module, the first connector of the one direct connection module being connected to the current source of the control module; and one or more indirect connection modules, the first connector of each of the one or more indirect connection modules being connected to the second connector of another power module.

15. The power conversion system according to claim 14, wherein the one or more indirect connection modules comprise a termination module that is not the other power module, and wherein a termination connector is connected to the second connector of the termination module, the termination connector configured to pass the switch drive current from the second connector to the return line, and pass the second switch drive current from the second connector to the second return line.

16. The power conversion system according to claim 11, wherein the main switch is configured to cut off the switch drive current supplied by the current source in response to an input from an external sensor configured to detect the external abnormality, and wherein the second main switch is configured to cut off the second switch drive current supplied by the second current source in response to an input from a second external sensor configured to detect the second external abnormality.

17. The power conversion system according to claim 11, wherein the power-off switch is configured to:

shorten a pair of power-off output terminals in response to an appearance of the switch drive current between a pair of power-off input terminals; and open the pair of power-off output terminals in response to the disappearance of the switch drive current between the pair of power-off input terminals, wherein the input cutoff switch is configured to:

shorten a pair of cutoff output terminals in response to an appearance of an on-current between a pair of cutoff input terminals, the on-current indicating an absence of the internal abnormality; and open the pair of cutoff output terminals in response to a disappearance of the on-current between the pair of cutoff input terminals, wherein one of the pair of power-off input terminals and one of the pair of cutoff output terminals are connected to each other in the first series connection.

18. The power conversion system according to claim 17, wherein each of the plurality of power modules further comprises:

power-off circuitry configured to stop output from the power conversion circuitry in response to the pair of power-off output terminals being opened; and internal diagnostic circuitry configured to:

supply the on-current between the pair of cutoff input terminals; and stop supplying the on-current in response to detecting the internal abnormality.

19. The power conversion system according to claim 17, wherein each of the plurality of power modules further comprises:

a first connector configured to receive the switch drive current supplied by the current source;

a second connector configured to output the switch drive current that has passed through the power-off switch and the input cutoff switch; and a return line configured to return the switch drive current from the second connector to the first connector.

20. A power module comprising:

power conversion circuitry connected to a control module and configured to output electric power;

a first connector configured to receive a switch drive current supplied by a current source;

a power-off switch configured to cut off the electric power from the power conversion circuitry in response to a disappearance of the switch drive current from the first connector;

an input cutoff switch configured to cut off the switch drive current to the power-off switch in response to an internal abnormality detected inside the power module;

a second connector configured to output the switch drive current that has passed through the power-off switch and the input cutoff switch; and a return line configured to return the switch drive current from the second connector to the first connector, wherein the power-off switch is configured to:

shorten a pair of power-off output terminals in response to an appearance of the switch drive current between a pair of power-off input terminals; and open the pair of power-off output terminals in response to the disappearance of the switch drive current between the pair of power-off input terminals, wherein the input cutoff switch is configured to:

shorten a pair of cutoff output terminals in response to an appearance of an on-current between a pair of cutoff input terminals, the on-current indicating an absence of the internal abnormality; and open the pair of cutoff output terminals in response to a disappearance of the on-current between the pair of cutoff input terminals, and wherein one of the pair of power-off input terminals and one of the pair of cutoff output terminals are connected to each other between the first connector and the second connector.

* * * * *